UNITED STATES PATENT OFFICE.

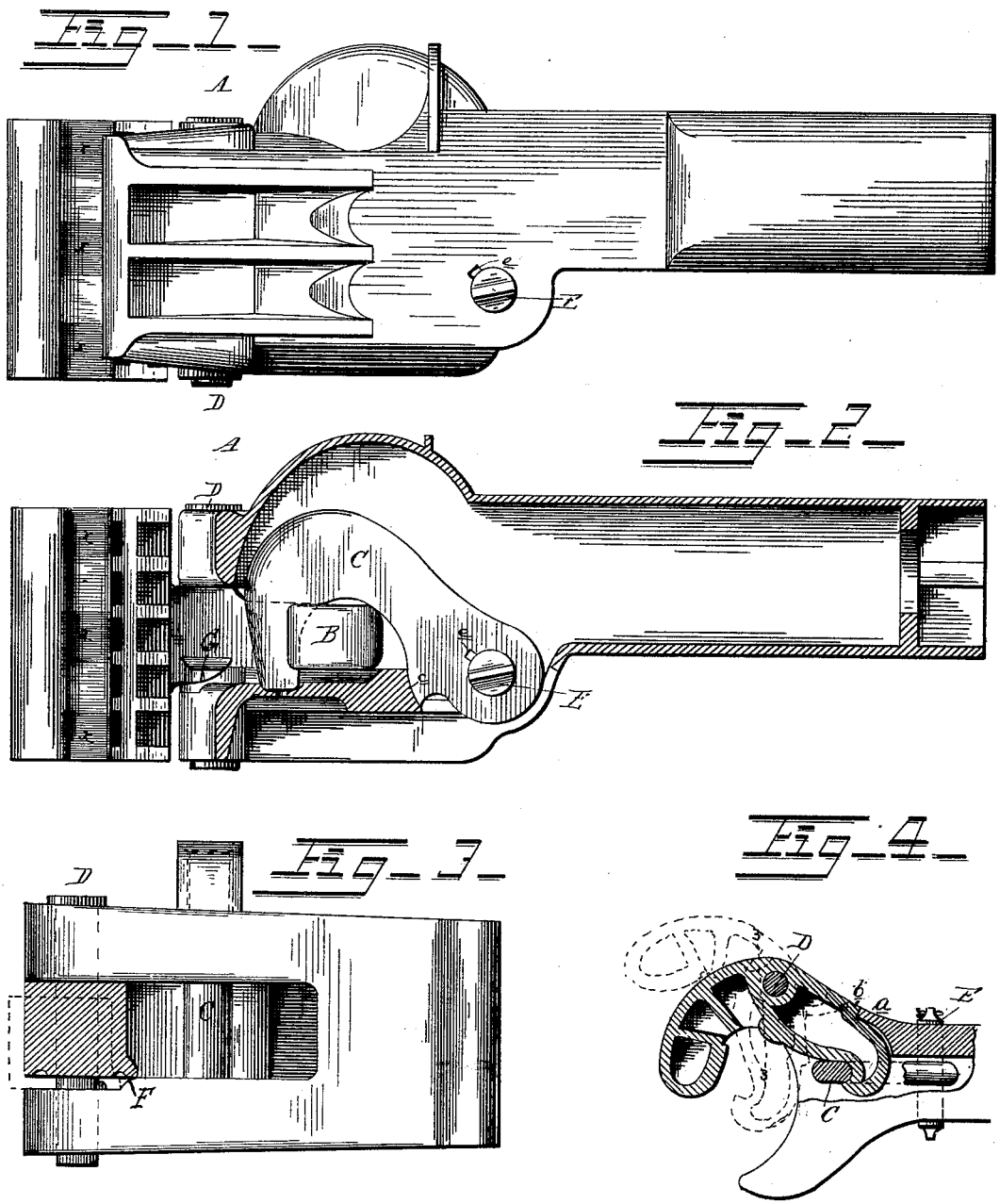

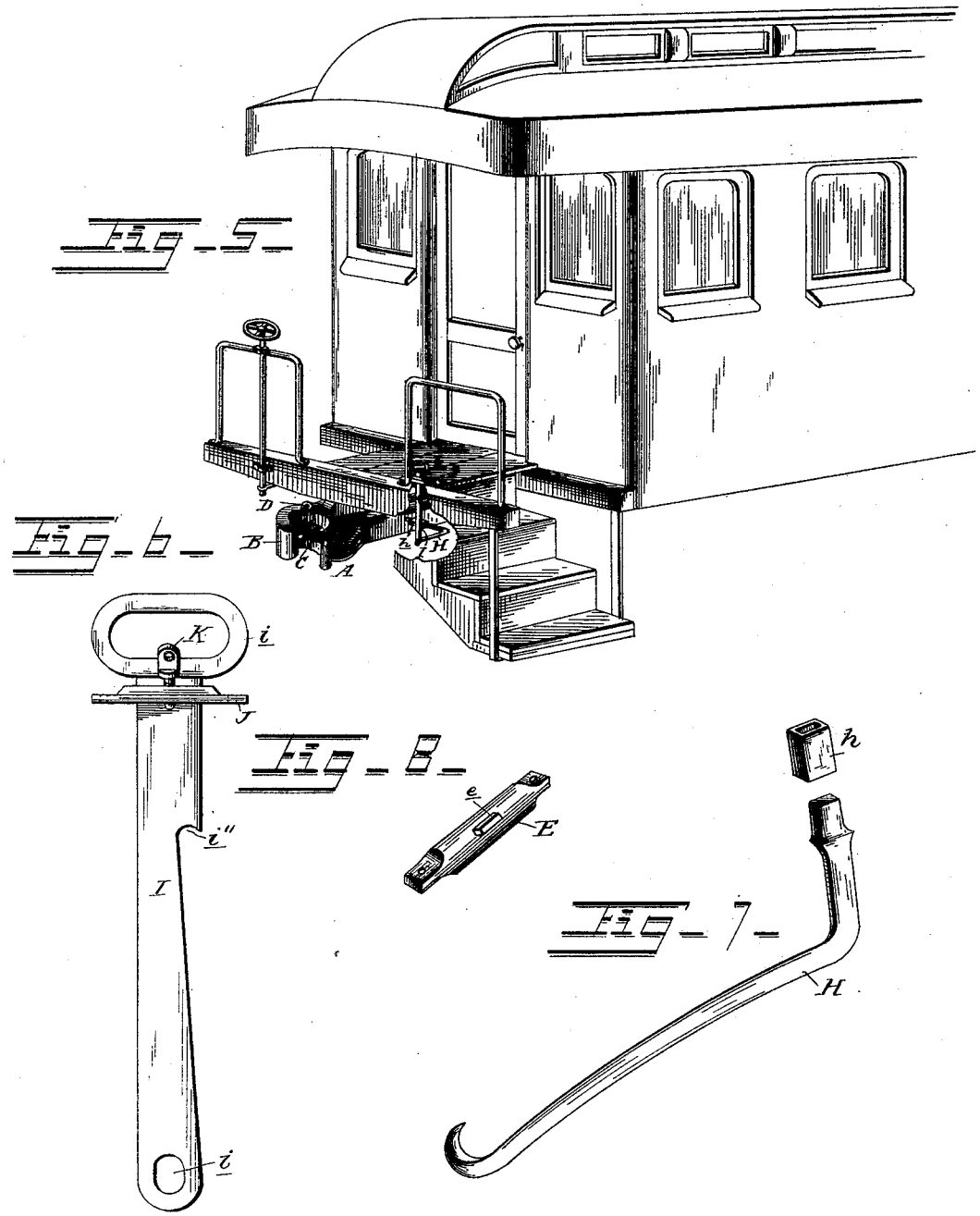

PERRY BROWN, OF LOUISVILLE, KENTUCKY, ASSIGNOR TO DANIEL E. DOHERTY AND MARK MUNDAY, OF SAME PLACE.

CAR-COUPLING.

SPECIFICATION forming part of Letters Patent No. 415,239, dated November 19, 1889.

Application filed March 7, 1889. Serial No. 302,274. (No model.)

*To all whom it may concern:*

Be it known that I, PERRY BROWN, a citizen of the United States, residing at Louisville, in the county of Jefferson and State of Kentucky, have invented certain new and useful Improvements in Car-Couplings, of which the following is a specification, reference being had therein to the accompanying drawings.

This invention relates to certain improvements on the car-coupling shown in my patents, Nos. 378,037 and 378,038; and it consists in the peculiar construction, arrangement, and combination of parts, hereinafter more particularly described, and then definitely pointed out in the claims.

In the accompanying drawings, Figure 1 represents a side view of the coupling; Fig. 2, a vertical longitudinal section; Fig. 3, a vertical section through the line 3 3 on Fig. 4; Fig. 4, a plan of the coupling partly in section; Fig. 5, a perspective view of part of a car with my coupling attached and provided with an uncoupling device; Fig. 6, a detail of part of the uncoupling device detached; Fig. 7, of other parts of the coupling device; Fig. 8, a perspective view of the pin on which the coupling hook or dog turns.

Referring now to the details of construction, A represents the draw-head, in which is secured the hook B and the dog C. The former is secured by a pin D in the usual manner; but the dog is provided with a peculiar pivot E, (see Fig. 7,) having a feather $e$ formed thereon which fits into a notch cut in the cylindrical surface of the opening through the dog. The opening through the near side of the draw-head is of similar shape to that of the dog, as will be seen on examining Fig. 1; but the hole on the other side is simply a round one, so that the feather $e$ will prevent the pivot E from passing through beyond the position it is intended to occupy, and a split pin set in a hole in the farther side of the pivot will prevent its return. The dog C has a projection $c$ in front of the pin E, which rests against the wall of the recess in which it works, so as to take off the strain from the pivot. The hook B is of peculiar form. It has a shoulder at $b$, which presses against a corresponding projection $a$ on the draw-head, so that in buffing the strain is taken off the pin D. The hook is cored out, forming vertical and horizontal bars, making a series of cells, as shown in Figs. 2 and 4, by which means the hook is much strengthened, as there is a very large amount of surface compared with the amount of metal, and it is the surface that forms the strength in cast-iron.

To prevent wear, I chill the acting surface of the hook at the points marked $x x x$, leaving the intermediate parts in the usual condition, by which means, while the chilled part prevents the rapid wearing away of the acting face of the hook, the inclined portion leaves the metal with its natural tenacity and strength.

On the lower part of the buffer-joint at F is shown an incline, and on the under side of the hook is shown another incline G, the two being so arranged that when the incline G begins to travel over the incline F the weight of the hook causes the incline G to descend the incline F, and thus the hook is automatically adjusted to the proper position for coupling, as shown by dotted lines in Fig. 4, without care on the part of the train-men.

In order that my coupler may be conveniently uncoupled, I connect to it a crank-arm H, (see Fig. 8,) which is connected with the pin E by a sleeve $h$, which may either be formed with the crank-arm H, or separate therefrom, as desired, and the parts are so connected that on raising the crank-arm the pin E turns and the dog C is raised, so that the hook B may be swung outward, and thus the cars become uncoupled.

For the greater convenience of uncoupling on the platform, I provide a lifter I, having at its lower end a hole $i$ to receive the curved end of the crank-arm, as shown in Fig. 5, and a handle $i'$ at top by which it may be raised. This lifter passes through a slotted casting J, set on the edge of the top of the platform of the car, and secured in its downward position by a pin K, which passes diagonally through the casting J and lifter I, and can be readily drawn out when it is desired to raise the lifter. If it is desired to hold the cars in an uncoupled position, the lifter is raised until the notch $i''$ rests on the top of the casting, and then the dog C is held so high that the hook B is free to move, and thus two or more cars may be run together without their being coupled. By this construction the coupling shown in my aforesaid patents is much improved, as the strain is taken off of the pins on which the hook and dog turn, its durability is increased, and it is rendered more convenient in coupling and uncoupling.

On freight-cars I may dispense with the lifter by extending the shaft of the crank-arm to each corner of that end of the car carrying the coupling, so that the train-men may operate the dog from either side of the car.

What I claim as new is—

1. A car-coupling having its hook formed with a series of vertical bars connected by horizontal bars, leaving a series of cells open at the inner face of the hook, substantially as shown and described, and for the purpose specified.

2. A car-coupling having its hook chilled in alternate lines, leaving the metal between said lines in an unchilled state, substantially as and for the purpose specified.

3. The combination, with a draw-head, of the dog C, provided with a projection $c$, working in contact with the wall of the recess in the drawhead, substantially as described.

4. The combination, with a draw-head having a projection $a$, of a hook having a shoulder $b$ to relieve the strain in buffing, substantially as described.

5. The combination, with the dog of a coupling, of a crank-arm and lifter, substantially as described.

6. The combination, with the dog of a coupling, of a crank-arm and lifter provided with a fastening-pin to hold the coupling-dog in its locking position, substantially as described.

7. The combination, with the dog of a coupling, of a crank-arm H and a lifter I, having a notch $i''$ to hold the dog in its uncoupled position, substantially as described.

In testimony whereof I affix my signature, in presence of two witnesses, this 25th day of February, 1889.

PERRY BROWN.

Witnesses:
WM. T. ROBERTSON,
T. J. W. ROBERTSON.